Oct. 4, 1927.

O. ECKERT 1,644,054

AUTOMATIC MACHINE FOR CASTING METAL UNDER PRESSURE

Filed Jan. 29, 1925

Oct. 4, 1927. 1,644,054
O. ECKERT
AUTOMATIC MACHINE FOR CASTING METAL UNDER PRESSURE
Filed Jan. 29, 1925 2 Sheets-Sheet 2
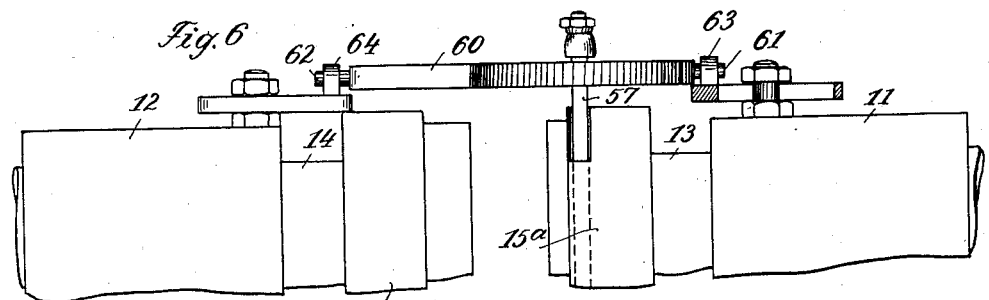
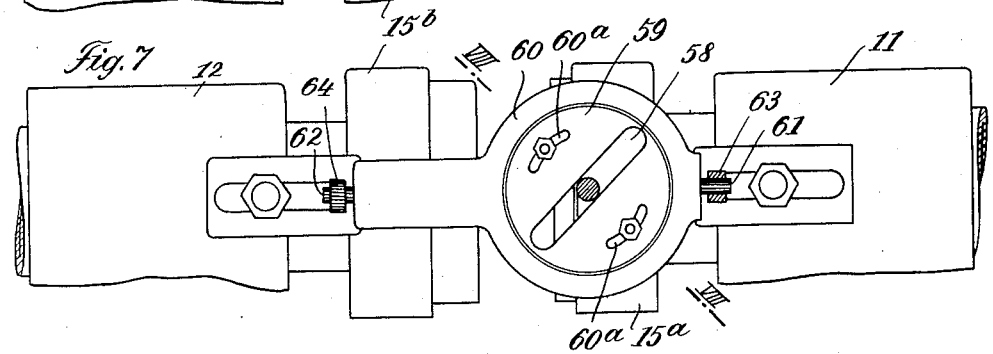
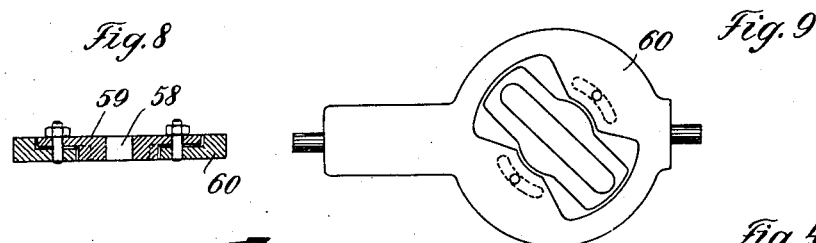
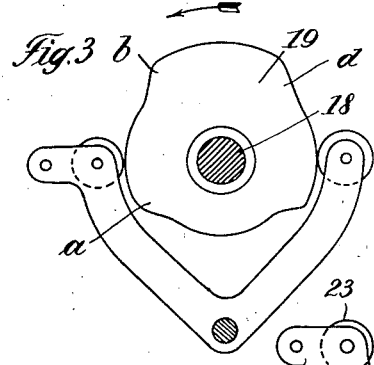
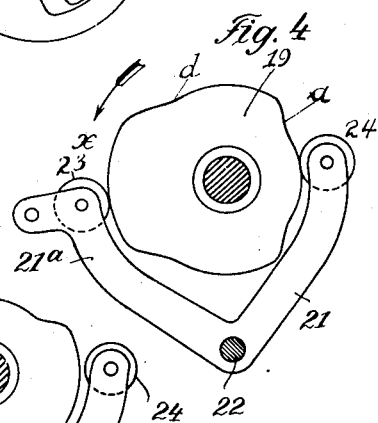
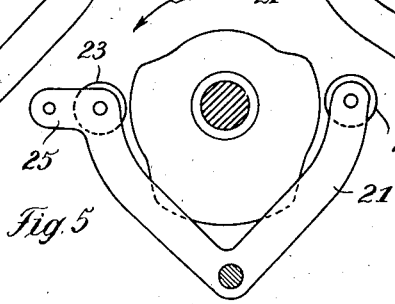

Patented Oct. 4, 1927.

1,644,054

UNITED STATES PATENT OFFICE.

OTTO ECKERT, OF NUREMBERG, GERMANY, ASSIGNOR TO PRACISIONSGUSS-FABRIK GEBR. ECKERT, OF NUREMBERG, BAVARIA, GERMANY.

AUTOMATIC MACHINE FOR CASTING METAL UNDER PRESSURE.

Application filed January 29, 1925, Serial No. 5,591, and in Germany February 2, 1924.

This invention relates to an automatically acting machine for casting metal under pressure in which the movements of the mould which are necessary for producing castings, viz advancing the mould to the injecting nozzle, closing the mould, removing the mould from the nozzle, opening the mould and ejecting the casting from the mould are automatically controlled by one cam keyed on the shaft of the machine.

According to the invention a machine is provided in which the cam disc keyed on the shaft of the machine is of symmetrical shape and in which the to and fro movement of the sliding plate which carries the mould parts is effected by an oscillatable fork the rollers of which bear on the circumference of the cam disc the line which connects the centres of the rollers extending always along a diameter of the cam disc.

An embodiment of the invention is shown, by way of example, on the accompanying drawing, in which:—

Figs. 3, 4 and 5 show on enlarged scale the cam disk for the oscillable fork in three different positions.

Figs. 6, 7 and 8, 9 show the arrangement of the guide plate for the operating lever of the one element of the mould in side elevation, plan view, section on line VIII—VIII of Fig. 7 and view from below respectively.

Figure 1:
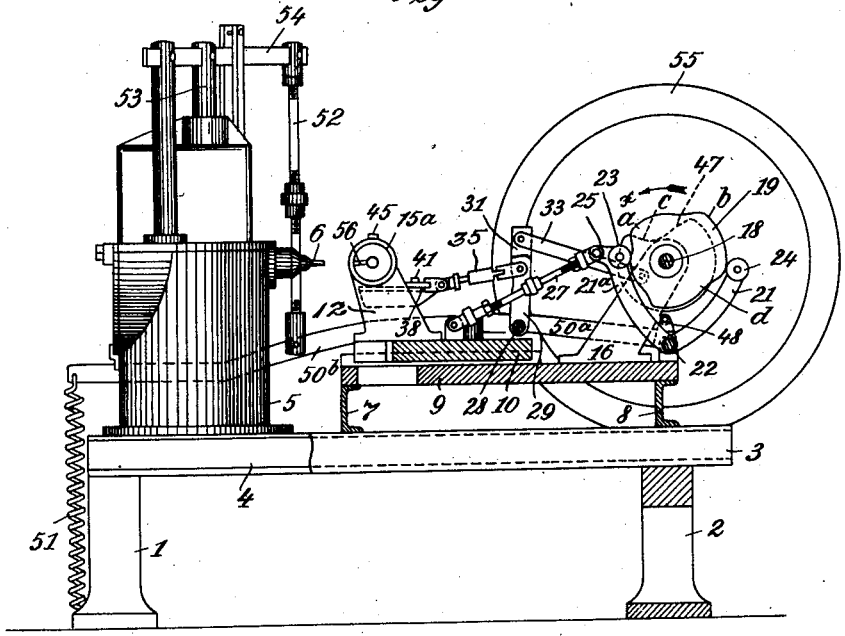
Fig. 1 shows the machine in longitudinal section partly in side elevation.
Figure 2:
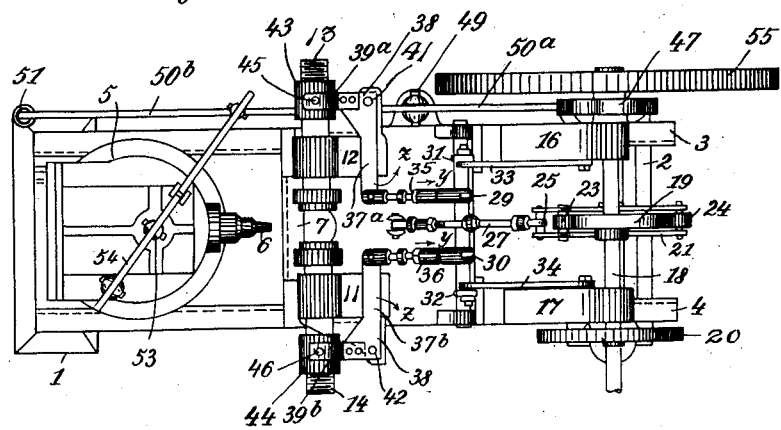
Fig. 2 is a plan view of Fig. 1.

In Figs. 1 and 2 the machine is shown, the mould being open and the cam disk being shown in the position in which, when it continues to rotate in the direction of the arrow, effects the closing of the mould and the advancing of the closed mould towards the stationary nozzle.

The under frame of the machine is composed of two cross supports 1 and 2 and of two U-irons 3 and 4 connecting said cross supports. On the rear end of the longitudinal U-irons the furnace casing 5 with the melting vessel in the same and having on the front side an injecting nozzle 6 is mounted. On two cross rails 7 and 8 a bed plate 9 is mounted on which a sliding plate 10 guided in a slideway is movable in the direction of the longitudinal axis of the machine. On the sliding plate 10 two brackets 11, 12 are fixed which carry movable sleeves 13, 14 to the inner ends of which the mould elements 15ᵃ and 15ᵇ are removably fixed (Figs. 6 and 7). In sleeve 14 an ejecting device of known type is arranged which serves for expelling the casting. As this ejecting device does not form part of the invention it is neither illustrated on the drawing nor will it be hereinafter described.

On the front part of the bed plate 9 two brackets 16, 17 are fixed in which a driving shaft 18 for a cam disk 19 is journaled. This cam disk 19 is of symmetrical form. The shaft 18 is driven by a spur wheel 20 meshing with a gear wheel of smaller size situated below said spur wheel and driven by a belt pulley keyed on the same shaft as said gear wheel. The ends of an oscillable fork 21, 21ᵃ pivotally mounted on a pivot bolt 22 bear against the cam disk 19. In the ends of the arms of fork 21, 21ᵃ rollers 23, 24 are mounted the pivot axles of which are in alignment with the axis of shaft 18. To the offset end 25 of the arm 21ᵃ of the fork 21, 21ᵃ a connecting rod 27 is hinged the other end of which is pivotally mounted on the slidable plate 10. On the plate 10 a shaft 28 is mounted on which two short levers 29, 30 and two long levers 31, 32 are keyed.

The ends of the long levers 31, 32 are hingedly connected by rods 33, 34 with the brackets 16, 17, the ends of the short levers 29, 30 being hingedly connected with the inner arms 37ᵃ, 37ᵇ of two elbow levers 38 by means of levers 35, 36 of adjustable length. The two outer arms 39ᵃ, 39ᵇ of the elbow levers which are adapted to swing around bolts 41, 42 are hingedly connected by means of bolts 45, 46 with rings 43, 44 fixed on the sleeves 13, 14. On shaft 18 is further keyed a cam disc 47 against which bears a roller 48 mounted in the end of one arm 50ᵃ of a two-armed lever 50ᵃ, 50ᵇ oscillably mounted on a bolt 49, the other arm 50ᵇ of said lever being connected, on the one hand to a spiral spring 51 and, on the other hand, by means of a rod 52 of adjustable length with the pressure lever 54 which controls the rod 53 of the pressure piston.

If the cylindrical circumference of one of the two mould elements is composed of several segments, which have parts projecting inwardly in relief and which are adapted to be pushed together to form a cylindrical hollow body and to be pulled away from one another in the well known manner by means of articulated levers, so that the projecting parts are withdrawn into the mould when the segments are pulled away from one another, the closing of this mould element and the opening of the same for releasing the core is effected in such a manner that the adjusting lever 57 Figs. 6, 7 engages with an oblique slot 58 of a circular disk 59, which is adjustably mounted on a plate 10 by bolts and grooves 60ª in said disc and is adapted to be locked in the adjusted position, so that in accordance with the required oscillating movement of the adjusting lever 57 the slot 58 can be made more or less oblique (Figs. 5, 6, 7, 8). The ends of the adjustable plate 60 have studs 61, 62 engaging with bores of lugs 63, 64 on the brackets 11, 12. When the sleeve 13 is advanced or moved back the adjusting lever 57 engaging with the oblique slot 58 is influenced in the one or other direction of oscillation and the circumference of the mould element 15ª is closed or opened.

The operation of the machine is as follows: When the cam disk 19 is rotated in the direction of arrow $x$ its projecting cam $a$ (Fig. 1) comes in contact with the roller 23 of the inner arm 21ª of the oscillable fork 21, 21ª. The fork 21, 21ª is consequently swung to the left and the slidable plate 10 with the sleeves 13, 14 mounted in the brackets 11, 12 and carrying the mould elements 15ª, 15ᵇ is moved towards the injecting nozzle 6. At the same time the pairs of levers 29, 30 and 31, 32 swing relative to the plate 10 in the direction of the arrow $y$ and the elbow levers 38 in the direction of the arrows $z$, whereby the sleeves 13, 14 which carry the mould elements 15ª, 15ᵇ are moved towards one another so that the mould is almost closed. If now the cam $b$ of cam disk 19 which is somewhat higher than cam $a$ is advanced towards the roller 23 (Figs. 3 and 4) a further shifting of the lever system is effected, the mould elements 15ª, 15ᵇ are completely closed and brought close to the injecting nozzle 6 so that this nozzle projects into the inflow channel 56 of the mould. In the meantime the inwardly curved part $c$ of cam disk 47 has come in contact with the roller 48 of the two-armed lever 50ª, 50ᵇ (Fig. 13) and at this instant the lever 50ª, 50ᵇ is pulled down by the action of the spiral spring 51 and the rod 53 of the pressure piston which is connected with arm 50ᵇ by connecting rod 52 and lever 54 is operated suddenly whereby the molten metal is injected under pressure from the vessel through the nozzle 6 into the mould. At the closing of the mould the mould element 15ª, the cylindrical circumference is composed of several segments is also completely closed by the adjusting lever 57 which engages with the oblique slot 58 of disk 59.

When part $d$ of cam disk 19 has come in contact with the roller 23 the part $a$ is near the roller 24 of the outer arm 21 of fork 21, 21ª (Fig. 4) and the backward movement begins. Fork 21, 21ª is swung in opposite direction as before until part $d$ is again in contact with roller 24. Owing to the backward movement of the slidable plate 10 the levers are swung in opposite direction as before, the mould is opened and removed from the nozzle, the casting is expelled in the well known manner by the ejecting device accommodated in sleeve 13, the segments of the circumference of the mould element 15ª are pulled back into the mould by the action of the adjusting lever 57 and the two-armed lever 50ª, 50ᵇ is made ready for use by the action of cam disk 47 in opposition to the action of the spiral spring 51.

The operation begins again so that at one single revolution of the cam disk one casting, or when several moulds are united to one mould, several castings are produced. A fly wheel 55 on driving shaft 18 serves to overcome greater resistances at the starting of the machine.

I claim:—

1. An automatically acting machine for casting metal under pressure comprising in combination with the main shaft of the machine and with the mould composed of several elements, a cam disc keyed on said main shaft said cam disc being of symmetrical shape and designed to control all the operations of the machine, a sliding plate carrying said mould elements, an oscillatable fork hingedly fixed to said sliding plate for communicating a to and fro movement to said sliding plate, and a roller in the end of each arm of said fork, said rollers bearing on the circumference of said cam disc so that the line which connects the centres of said rollers extends always along a diameter of said cam disc.

2. An automatically acting machine for casting metal under pressure comprising in combination with the main shaft of the machine and with the mould composed of several elements, a cam disc keyed on said main shaft said cam disc being of symmetrical shape and designed to control all the operations of the machine, a sliding plate carrying said mould elements, an oscillatable fork hingedly fixed to said sliding plate for communicating a to and fro movement to said sliding plate, a roller in the end of each arm of said fork said rollers bearing on the circumference of said cam disc so that the line which connects the centres of said rollers extends always along a diameter of said cam disc, two sleeves carrying each one of said mould elements said sleeves being arranged transverse to the longitudinal axis of the machine, brackets in which said sleeves are mounted, two brackets on said sliding plate, and symmetrically arranged articulated levers for connecting said sleeve brackets with said brackets of the sliding plate so that at the to and fro movement of said sliding plate said elements of the mould are closed or opened transversely to the longitudinal axis of the machine.

In testimony whereof I affix my signature.

OTTO ECKERT.